US012493559B2

(12) United States Patent
Kalamatianos et al.

(10) Patent No.: US 12,493,559 B2
(45) Date of Patent: Dec. 9, 2025

(54) MODIFYING SYSTEM DIRECTORY CAPACITY BASED ON POWER STATE TRANSITION

(71) Applicant: Advanced Micro Devices, Inc., Santa Clara, CA (US)

(72) Inventors: John Kalamatianos, Arlington, MA (US); Srilatha Manne, Seattle, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 78 days.

(21) Appl. No.: 18/621,381

(22) Filed: Mar. 29, 2024

(65) Prior Publication Data

US 2025/0307163 A1    Oct. 2, 2025

(51) Int. Cl.
*G06F 12/0871* (2016.01)
*G06F 12/0806* (2016.01)
*G06F 12/128* (2016.01)

(52) U.S. Cl.
CPC ...... *G06F 12/0871* (2013.01); *G06F 12/0806* (2013.01); *G06F 12/128* (2013.01); *G06F 2212/502* (2013.01); *G06F 2212/601* (2013.01)

(58) Field of Classification Search
None
See application file for complete search history.

(56) References Cited

U.S. PATENT DOCUMENTS

2019/0129856 A1\* 5/2019 Jean ................... G06F 12/0246

OTHER PUBLICATIONS

Agarwal, A., et al., "An evaluation of directory schemes for cache coherence", ACM SIGARCH Computer Architecture News, vol. 16, No. 2 [retrieved Jan. 23, 2024]. Retrieved from the Internet <https://doi.org/10.1145/633625.52432>, May 17, 1988, 10 pages.

Caheny, Paul, et al., "Reducing Cache Coherence Traffic with Hierarchical Directory Cache and NUMA-Aware Runtime Scheduling", PACT '16: Proceedings of the 2016 International Conference on Parallel Architectures and Compilation, Sep. 11, 2016.

Cantin, et al., "Coarse-grain Coherence Tracking: RegionScout and Region Coherence Arrays", IEEE Micro, 2006, pp. 70-79.

Chaiken, D, et al., "Directory-based cache coherence in large-scale multiprocessors", Computer, vol. 23, No. 6 [retrieved Jan. 23, 2024]. Retrieved from the Internet <https://doi.org/10.1109/2.55500>, Jun. 1990, 10 pages.

Cuesta, Blas, et al., "Increasing the effectiveness of directory caches by deactivating coherence for private memory blocks", ISCA '11: Proceedings of the 38th annual international symposium on Computer architecture [retrieved Dec. 19, 2023]. Retrieved from the Internet <https://doi.org/10.1145/2000064.2000076>, Jun. 2011, 11 pages.

Das, et al., "Dynamic Directories: A Mechanism for reducing On-Chip Interconnect power in multicores", 2012 Design, Automation & Test in Europe Conference & Exhibition (DATE), Dresden, Germany, 2012, pp. 479-484.

(Continued)

*Primary Examiner* — Charles J Choi
(74) *Attorney, Agent, or Firm* — FIG. 1 Patents

(57) ABSTRACT

A system includes a core complex with multiple processor cores and multiple caches. The system also includes system directories that track cache residency in the caches of the core complex. Based at least in part on a power state transition of the core complex a system directory can adjust its capacity to track the cache residency.

20 Claims, 6 Drawing Sheets

(56) References Cited

OTHER PUBLICATIONS

Lenoski, Daniel, et al., "The directory-based cache coherence protocol for the DASH multiprocessor", ACM SIGARCH Computer Architecture News, vol. 18, No. 2SI [retrieved Jan. 23, 2024]. Retrieved from the Internet <https://doi.org/10.1145/325096.325132>, May 1, 1990, 12 pages.

Magklis, G., et al., "Dynamic frequency and voltage scaling for a multiple-clock-domain microprocessor", IEEE Micro, vol. 23, No. 6 [retrieved Dec. 19, 2023]. Retrieved from the Internet <https://doi.org/10.1109/MM.2003.1261388>, Nov. 2003, 7 pages.

Marty, et al., "Virtual Hierarchies to support Server Consolidation", ISCA '07: Proceedings of the 34th annual international symposium on Computer architecture, Jun. 2007, pp. 46-56.

Moshovos, et al., "Jetty: Filtering snoops for reduced energy consumption in SMP Servers", Proceedings HPCA Seventh International Symposium on High-Performance Computer Architecture, Monterrey, Mexico, 2001, pp. 85-96.

Moshovos, et al., "RegionScout: Exploiting coarse-grain sharing in Snoop-based Coherence", IEEE, 2005, 12 pages.

Nagarajan, Vijay, et al., "A Primer on Memory Consistency and Cache Coherence", 2nd Edition, Synthesis Lectures on Computer Architecture, Morgan & ClayPool Publishers, 2020, 296 pages.

Sanchez, Daniel, et al., "SCD: A scalable coherence directory with flexible sharer set encoding", IEEE International Symposium on High-Performance Comp Architecture [retrieved Dec. 19, 2023]. Retrieved from the Internet <https://doi.org/10.1109/HPCA.2012.6168950>, Feb. 2012, 12 pages.

Schuchhardt, Matthew, et al., "The Impact of Dynamic Directories on Multicore Interconnects", Computer, vol. 46, No. 10 [retrieved Dec. 19, 2023]. Retrieved from the Internet <https://doi.org/10.1109/MC.2013.334>, Sep. 10, 2013, 9 pages.

\* cited by examiner

400

402
Identify, among the tracking locations, one or more tracking locations with a least number of tracked cache lines

404
Deactivate the one or more tracking locations

500

502
Identify, among the tracking locations, one or more tracking locations with a least populated cache line region

504
Deactivate the one or more tracking locations

MODIFYING SYSTEM DIRECTORY CAPACITY BASED ON POWER STATE TRANSITION

BACKGROUND

Multicore systems on a chip (SoC) integrate central processing unit (CPU) cores and dynamic random access memory (DRAM) channels in a single package, such as to scale up compute throughput and memory capacity and bandwidth. An SoC, for instance, is an integrated circuit that integrates components of a computer or other electronic system on a single substrate and/or microchip. These components include on-chip central processing unit (CPU), memory interfaces, input/output devices and interfaces, and secondary storage interfaces, often alongside other components such as radio modems and a graphics processing unit (GPU). Power management on SoC is a primary consideration, particularly when scaling SoC to larger implementations and larger systems.

DETAILED DESCRIPTION

Overview

Figure 1:
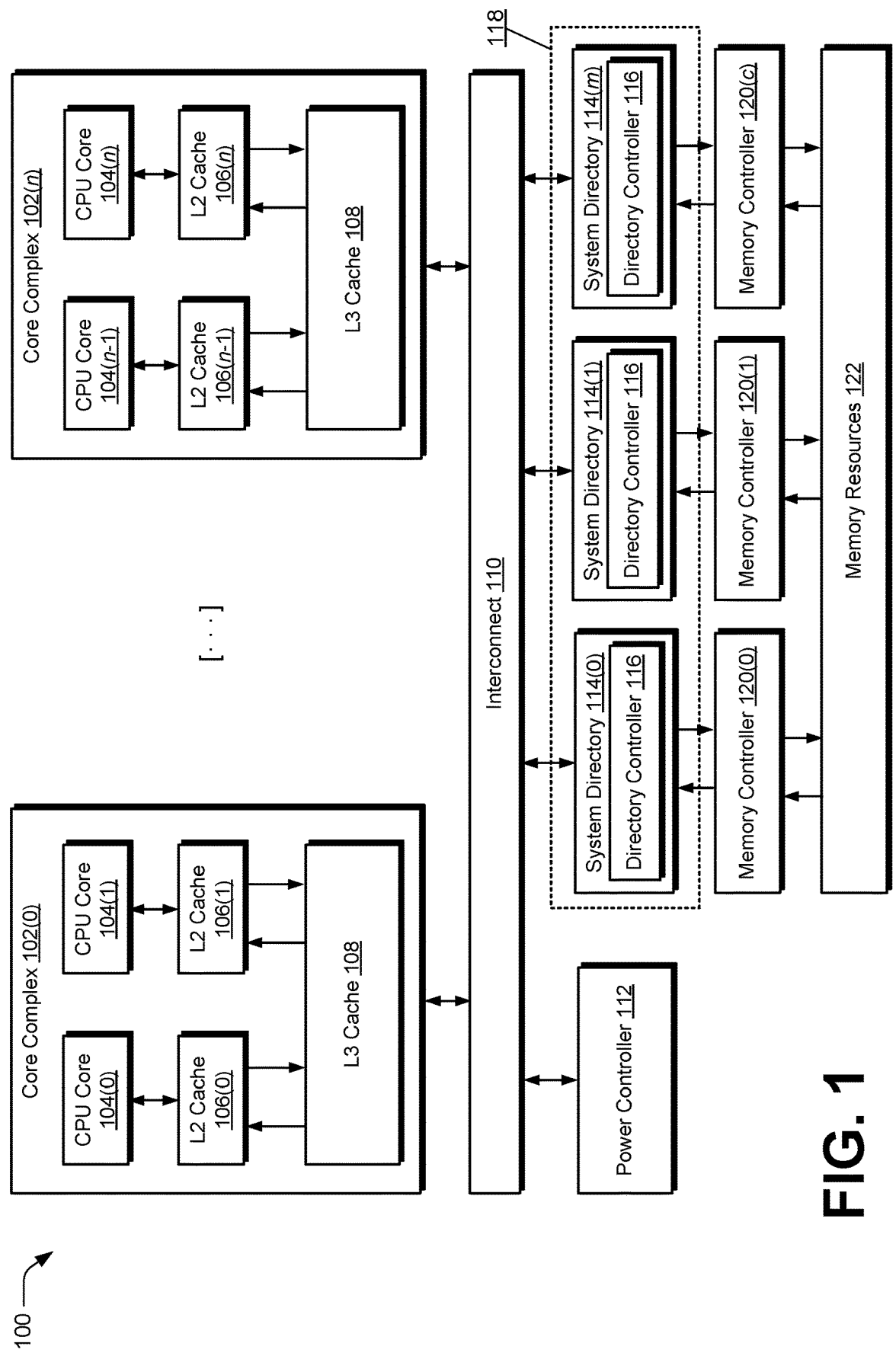
FIG. 1 is a block diagram of a non-limiting example system.

In SoC, power consumption is a primary concern when considering increased scale due to several challenges, including costs involved in supporting more DRAM channels (e.g., more I/O pins), costs of novel packaging to support higher Thermal Design Points (TDPs), and high power costs of adding CPU cores that run at high frequencies and/or voltages.

Accordingly, techniques described herein provide ways for dynamically reducing power usage in SoC. The described techniques, for instance, monitor activity across the core complex domains of a multicore SoC to reduce dynamic power consumption in the SoC when the SoC is not being fully utilized. For instance, in data center scenarios, average utilization can be low over certain time periods because of diurnal behavior and/or seasonal behavior (holiday shopping seasons versus normal operation, for instance), resulting in multiple cores in a SoC being idle and power gated. As discussed herein, for instance, "power gating" represents a technique to reduce power consumption by shutting off power current to blocks of a circuit that are not currently in use.

According to implementations, dynamic power management determines to power gate idle core complexes in a multicore SoC to adjust compute power available in the SoC to better match application parameters. As an example, in a client SoC, power management determines to power gate a core complex with inactive cores to prolong battery life by reducing static power (e.g., via power gating of cores, shared caches, and/or private caches inside the core complex) and reducing dynamic power, such as by not issuing further probes by a system directory to powered-off core complexes.

In another example, in a server SoC where a virtual machine is idle or no virtual machines have been allocated to the core complex, power management determines to power gate core complexes to improve SoC performance and reduce overall operating cost. According to implementations a power gated core complex does not retain state. Thus, in such scenarios valid state including modified lines in an L1 cache, L2 cache, and L3 cache are to be written back to memory before the core complex is power gated. In such scenarios, a cacheable address space tracked by a system directory changes. Further, an amount of state tracked when one or more core complexes are power gated is smaller than the state tracked by the system directory when all core complexes are active.

According to implementations a system directory supports SoC-wide coherence by tracking data residency in a cacheable address space in the SoC. Further details concerning tracking data residency cacheable address spaces (e.g., cache lines of a cache) are discussed below. Typically, it is expensive to track residency of every cached line in a cache, and thus the system directory is typically sized to track a certain percentage of the cacheable address space that maximizes performance and/or area. This percentage, for example, is expressed as a ratio of core complex cache to system directory capacity. If the cacheable address space dynamically changes, the system directory capacity that maintains equivalent performance and/or area can also change while maintaining an equivalent ratio and thus optimal performance. The described implementations thus enable adjusting system directory capacity based on available cache capacity to achieve energy savings, such as to conserve dynamic energy within an SoC.

In some aspects, the techniques described herein relate to a system including: a core complex including one or more processor cores and at least one cache; and a system directory implemented at least partially in hardware to receive a message indicating a power state transition of the core complex and to apply a capacity adjustment to the system directory based at least in part on an adjustment of cache capacity of the at least one cache as part of the power state transition of the core complex.

In some aspects, the techniques described herein relate to a system, wherein the system directory includes one or more memory arrays to track cache line residency in cache lines of the at least one cache, and to apply the capacity adjustment to the system directory is operable to modify tracked cache lines of the at least one cache in the one or more memory arrays.

In some aspects, the techniques described herein relate to a system, wherein to modify the tracked cache lines, the system directory is operable to one or more of: deactivate tracking of one or more of the tracked cache lines in the one or more memory arrays; or activate tracking of one or more of the tracked cache lines in the one or more memory arrays.

In some aspects, the techniques described herein relate to a system, wherein the message identifies multiple power gated cache lines of the at least one cache, and wherein to modify the tracked cache lines the system directory is operable to deactivate tracking of the multiple power gated cache lines in the one or more memory arrays.

In some aspects, the techniques described herein relate to a system, wherein the system directory includes tracking locations that each track one or more cache lines of the at least one cache, and wherein to apply the capacity adjustment to the system directory, the system directory is operable to: identify, among the tracking locations, one or more tracking locations with a least number of tracked cache lines; and deactivate the one or more tracking locations.

In some aspects, the techniques described herein relate to a system, wherein the system directory includes tracking locations that each track one or more cache line regions of the at least one cache, and wherein to apply the capacity adjustment to the system directory, the system directory is operable to: identify, among the tracking locations, one or more tracking locations with a least populated cache line region; and deactivate the one or more tracking locations.

In some aspects, the techniques described herein relate to a system, wherein the system directory includes tracking locations that each track one or more cache lines of caches of multiple core complexes, and wherein to apply the capacity adjustment to the system directory, the system directory is operable to: identify a set of tracking locations that track cache lines for multiple non-power gated core complexes of the multiple core complexes; identify one or more tracking locations from the set of tracking locations that track a least number of cache lines of the multiple non-power gated core complexes; and deactivate the one or more tracking locations.

In some aspects, the techniques described herein relate to a system, wherein the system directory includes a set of tracking locations that each track one or more cache lines of the at least one cache, and wherein to apply the capacity adjustment to the system directory, the system directory is operable to: identify, from the set of tracking locations, a subset of tracking locations with a highest number of cache lines being designated as a next victim in a cache replacement algorithm; and deactivate the subset of tracking locations.

In some aspects, the techniques described herein relate to a system, wherein the system directory includes a set of tracking locations that each track one or more cache lines of the at least one cache, and wherein to apply the capacity adjustment to the system directory, the system directory is operable to apply, to a subset of the tracking locations, one or more of power gating or clock gating.

In some aspects, the techniques described herein relate to a system directory implemented at least partially in hardware, the system directory including: one or more memory arrays to track cache line residency in cache lines of at least one cache of a core complex; and a directory controller to receive a message indicating a power adjustment at the core complex and to modify tracked cache lines in the one or more memory arrays to apply a capacity adjustment to the system directory.

In some aspects, the techniques described herein relate to a system directory, wherein to modify the tracked cache lines, the directory controller is operable to one or more of: deactivate tracking of one or more of the tracked cache lines in the one or more memory arrays; or activate tracking of one or more of the tracked cache lines in the one or more memory arrays.

In some aspects, the techniques described herein relate to a system directory, wherein the message identifies multiple power gated cache lines of the at least one cache, and wherein to modify the tracked cache lines the directory controller is operable to deactivate tracking of the multiple power gated cache lines in the one or more memory arrays.

In some aspects, the techniques described herein relate to a system directory, wherein the system directory includes tracking locations within the one or more memory arrays that each track one or more cache lines of the at least one cache, and wherein to apply the capacity adjustment to the system directory, the directory controller is operable to: identify, among the tracking locations, one or more tracking locations with a least number of tracked cache lines; and deactivate the one or more tracking locations.

In some aspects, the techniques described herein relate to a system directory, wherein the system directory includes tracking locations within the one or more memory arrays that each track one or more cache line regions of the at least one cache, and wherein to apply the capacity adjustment to the system directory, the directory controller is operable to: identify, among the tracking locations, one or more tracking locations with a least populated cache line region; and deactivate the one or more tracking locations.

In some aspects, the techniques described herein relate to a system directory, wherein the system directory includes tracking locations within the one or more memory arrays that each track one or more cache lines of caches of multiple core complexes, and wherein to apply the capacity adjustment to the system directory, the directory controller is operable to: identify a set of tracking locations that track cache lines for multiple non-power gated core complexes of the multiple core complexes; identify one or more tracking locations from the set of tracking locations that track a least number of cache lines of the multiple non-power gated core complexes; and deactivate the one or more tracking locations.

In some aspects, the techniques described herein relate to a system directory, wherein the system directory includes a set of tracking locations within the one or more memory arrays that each track one or more cache lines of the at least one cache, and wherein to apply the capacity adjustment to the system directory, the directory controller is operable to: identify, from the set of tracking locations, a subset of tracking locations with a highest number of cache lines being designated as a next victim in a cache replacement algorithm; and deactivate the subset of tracking locations.

In some aspects, the techniques described herein relate to a system directory, wherein the system directory includes a set of tracking locations within the one or more memory arrays that each track one or more cache lines of the at least one cache, and wherein to apply the capacity adjustment to the system directory, the directory controller is operable to apply, to a subset of the tracking locations, one or more of power gating or clock gating.

In some aspects, the techniques described herein relate to a method including: tracking, at a system directory, cache line residency in cache lines of a cache of a core complex; receiving a message indicating a power state transition at the core complex; and modifying, in the system directory, tracked cache lines to apply a capacity adjustment to the system directory.

In some aspects, the techniques described herein relate to a method, wherein modifying the tracked cache lines to apply the capacity adjustment includes one or more of: deactivating one or more tracking locations within the system directory that correspond to power gated cache lines of the core complex; or activating one or more tracking locations within the system directory that correspond to power gated cache lines of the core complex.

In some aspects, the techniques described herein relate to a method, wherein deactivating the one or more tracking locations includes applying one or more of power gating or clock gating to the one or more tracking locations.

FIG. 1 is a block diagram of a non-limiting example system 100. The system 100, for example, is implemented as part of a system on a chip. The illustrated system 100 includes multiple core complexes 102 including a core complex 102(0) and a core complex 102(n). Further, each core complex 102 includes a set of CPU cores 104, a respective L2 cache 106 for each CPU core 104, and an L3 cache 108 that is sharable between different CPU cores 104 within a respective core complex 102. The core complex 102(0), for instance, includes a CPU core 104(0) coupled to an L2 cache 106(0) and a CPU core 104(1) coupled to an L2 cache 106(1). Further, the core complex 102(n) includes a CPU core 104(n-1) coupled to an L2 cache 106(n-1) and a CPU core 104(n) coupled to an L2 cache 106(n). In at least some examples each core complex 102 represents an integrated circuit that includes various components described above, e.g., a set of CPU cores 104, a respective L2 cache 106 for each CPU core 104, and an L3 cache 108 that is sharable between different CPU cores 104 within a respective core complex 102.

The system 100 further includes an interconnect 110 that enables intercommunication between the core complexes 102 and other components of the system 100, such as memory resources and control functionality of the system 100. For instance, connected to the interconnect 110 is a power controller 112 and system directories 114. The power controller 112, for example, represents functionality for controlling different power settings of the system 100 and as further detailed herein, controls power settings of the core complexes 102. The system directories 114 represent functionality to track data occupancy in caches of the core complexes 102, e.g., the L2 caches 106, the L3 caches 108, etc. In this particular example, the system directories 114 include a system directory 114(0), a system directory 114(1), and a system directory 114(m). The system directories 114 are also referred to as "probe filters." For instance, in probe filter implementations, a system directory 114 controls communications between the core complexes 102 and the memory resources 122. Among other functionality the system directories 114 support data coherence within the caches of the core complexes 102. The system directories 114, for instance, represent hardware and logic for implementing various aspects of the techniques described herein.

The system directories 114 each include a respective directory controller 116 which represents functionality for controlling operation of the system directories 114. For instance, and as detailed throughout this disclosure, the directory controller 116 dynamically controls (e.g., decreases and/or increases) capacity of the system directories 114, such as based on changes in power state of the core complexes 102. The directory controller 116, for instance, adjusts capacity of the system directories 114 such as based on power state transitions in the core complexes 102. Examples of a power state transition include a decrease in power usage of a core complex 102 and/or an increase in power usage of a core complex 102. For example, the directory controller 116 is operable to increase a capacity of a system directory 114 based on an increase in power usage of a core complex 102, and to decrease a capacity of a system directory 114 based on a decrease in power usage of a system directory 114. Among other advantages, controlling capacity of the system directories 114 reduces energy consumption of the system 100, e.g., of a SoC.

According to implementations the different system directories 114 represent different instances of system directory slices 118 of a sliced system directory architecture. For instance, each of the system directories 114 represents an instance of a system directory slice 118 and is accessible to multiple individual instances of the core complexes 102. Thus, in implementations the directory controllers 116 are considered "slice controllers" that track state of a respective system directory 114 and control operation of the respective system directory 114.

The system directories 114 are connected to memory controllers 120 including a memory controller 120 (0), a memory controller 120 (1), and a memory controller 120 ©. The memory controllers 120 enable interconnectivity of the core complexes 102 with memory resources 122 of the system 100, such as for performing memory read and write operations.

Figure 2:
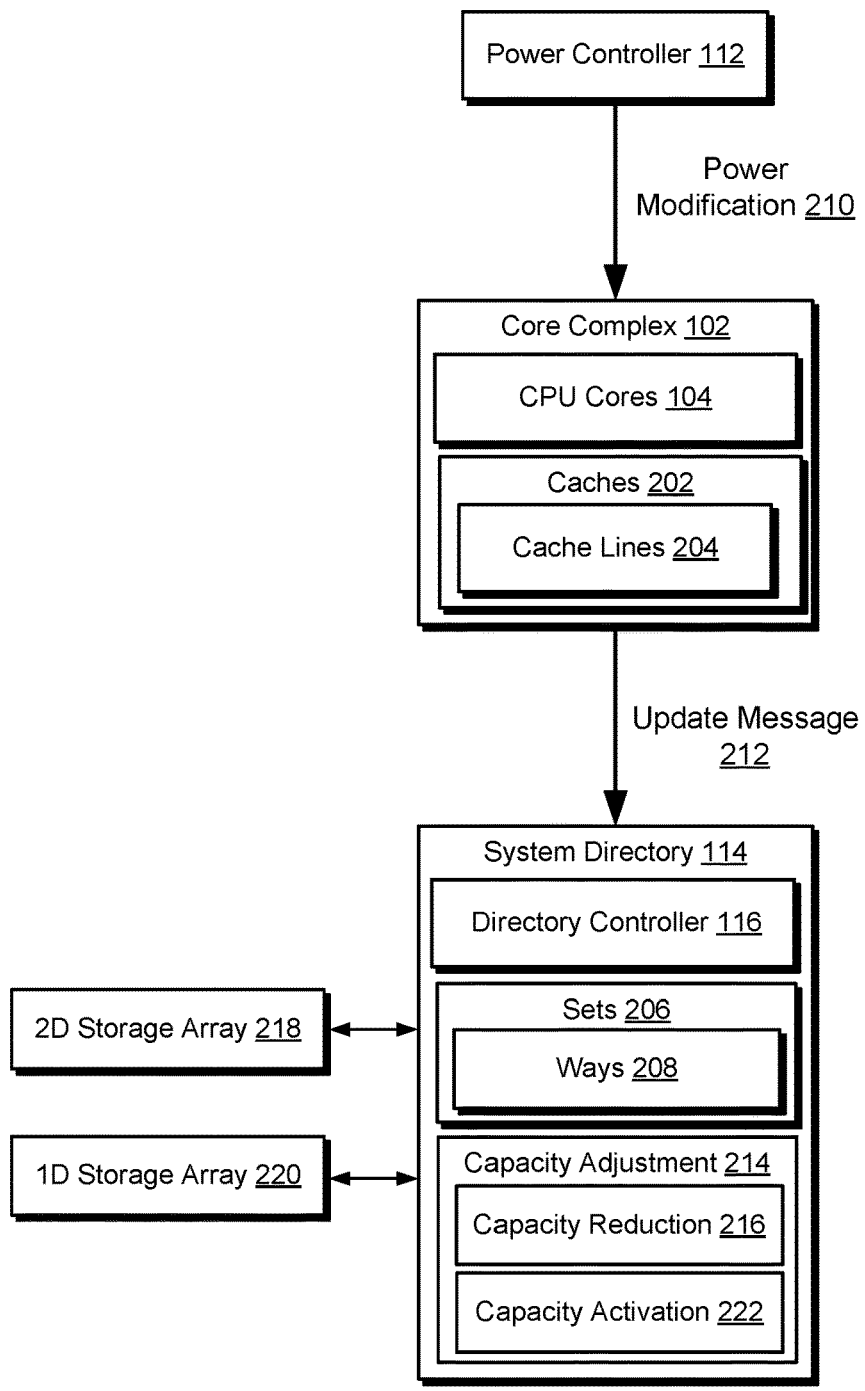
FIG. 2 illustrates a system that is operable to perform example implementations described herein.

FIG. 2 illustrates a system 200 that is operable to perform example implementations described herein. The system 200 includes a core complex 102 with CPU cores 104 and caches 202. The caches 202, for instance, include various types of data caches such as L1 caches, L2 caches 106, an L3 cache 108, and so forth. Further, the caches 202 include cache lines 204 which represent data units that are usable for transferring data between the memory resources 122 and the caches 202. The cache lines 204, for instance, represent working data for the CPU cores 104 stored by the caches 202.

The system 200 also includes a system directory 114 with sets 206 and ways 208. The sets 206, for instance, represent associative memory arrays that track cache line 204 residency in the caches 202. According to implementations, a memory array represents a portion of physical memory within the system directory 114 (e.g., random-access memory (RAM)) that is operable to store data, such as for tracking cache line 204 residency in the caches 202. Cache line residency, for instance, refers to a data storage status of a cache line. Further, the ways 208 represent subdivisions of the sets 206. The ways 208, for instance, represent fixed tracking locations inside the sets 206 and line addresses for instances of the cache lines 204 are populated to the ways 208 to enable tracking of cache lines 204. According to implementations modification of the capacity of the system directory 114 includes the directory controller 116 deactivating and activating instances of the ways 208.

The system 200 is illustrated and discussed with reference to a single core complex 102 and a single system directory 114. As illustrated in the system 100, however, SoCs often include multiple core complexes 102 and multiple system directories 114 that intercommunicate. Thus, implementations described herein are applicable across different core complexes 102 and system directories 114 to perform the described techniques.

Further to the system 200 the power controller 112 performs a power modification 210 on the core complex 102. The power modification 210, for instance, includes power gating of one or more of the CPU cores 104 and/or the caches 202, such as based on a determination that the core complex 102 has reached a threshold level of inactivity. In at least one implementation and based on the power modification 210 the core complex 102 transmits an update message 212 to the system directory 114 indicating that the power modification 210 is applied to the core complex 102. In response to the update message 212 the system directory 114 implements a capacity adjustment 214 to reduce a capacity of the system directory 114. The capacity adjustment 214, for instance, represents a capacity reduction 216. In implementations the capacity reduction 216 includes adjusting associativity between the sets 206 and the caches 202. For instance, ways 208 associated with cache lines 204 in the power modified core complex 102 are deactivated which causes line eviction from the sets 206 and effectively reduces the capacity of the system directory 114. Thus, at least some implementations modify a number of active ways 208 in a set 206 without modifying a number of sets 206.

As referenced above in a sliced architecture the system directory 114 represents a system directory slice. Accordingly, in such scenarios when the power modification 210 is applied the core complex 102 transmits a single update message 212 to the system directory 114. The update message 212, for instance, identifies multiple cache lines 204 that are invalidated based on the power modification 210. Alternatively or additionally the update message identifies cache line regions of cache lines 204 that are invalidated.

Based on the update message 212, to apply the capacity reduction 216 the directory controller 116 iterates over the sets 206 to deactivate ways 208 that correspond to cache lines 204 for caches 202 that are being power gated. This implementation contrasts with some conventional implementations that send a single update message for each invalidated cache line, and thus the described implementation reduces traffic on the interconnect 110 which results in lower energy usage and higher performance. Further, it reduces a time for the core complex 102 to enter a power gated state by not requiring the core complex 102 to send an update for every cache line 204, e.g., for both clean and dirty cache lines 204.

Alternatively or additionally the capacity reduction 216 involves lowering system directory 114 capacity by deactivating ways 208 with the lowest number of tracked cache lines 204. Tracked cache lines, for instance, represent cache lines 204 for which cache line residency information (e.g., data storage status of cache lines 204) is tracked and stored by the system directory 114. In implementations the system directory 114 queries cache lines 204 to determine their respective cache line residency, and can store cache line residency information for the cache lines 204. This minimizes the cache lines 204 being evicted across the caches 202 when shutting down one or more ways 208. This implementation applies for both line-based implementations of system directories 114 and region-based implementations of system directories 114. In a region-based implementation, for example, the system directory 114 tracks metadata for regions of cache lines 204 (e.g., 4 KB regions) such as in the sets 206. In region-based implementations of system directories 114 each region is not always fully populated (e.g., not every cache line 204 is covered in a set 206) so there may be regions with low coverage.

In implementations the system directories 114 are physically distributed and address interleaved, and one technique to find ways 208 with the lowest number of tracked cache lines 204 is to communicate notifications (e.g., queries) among the different system directories 114 to identify ways 208 with a lowest number of tracked cache lines 204. Implementations communicate such notifications when the core complex 102 is power gated and/or periodically while an application is running on the core complex 102. Alternatively or additionally each system directory 114 individually identifies the ways 208 with the lowest number of tracked cache lines 204 and determines independently which ways 208 to shut down.

Alternatively or additionally implementations perform capacity reduction 216 by deactivating ways 208 that track the least number of cache lines 204 resident in remaining active core complexes 102, e.g., non-power gated core complexes 102 other than the power gated core complex 102. Such implementations involve the system directory 114 tracking the number of cache lines 204 resident per core complex 102 and per way 208. For instance, a 2D storage array 218 is indexed by way 208 in one dimension and by core complex 102 identifier in the other dimension. The 2D storage array 218, for example, is referred to as a CCX Residency Array (CRA). As cache line entries get installed and evicted from system directories 114 during normal operation, counters in the 2D storage array 218 are updated.

When a core complex 102 is power gated, cache 202 evictions update both a system directory 114 and the 2D storage array 218. The individual system directories 114 then calculate the number of cache lines 204 resident in the remaining active core complexes 102 per way 208 by scanning entries in the 2D storage array 218. The system directories 114 then sort the core complexes 102 based on their minimum cache line 204 population per way 208 in a system directory 114 and/or across multiple system directories 114, such as where a dedicated interconnect (e.g., the interconnect 110) between the system directories 114 is present. In implementations capacity reduction 216 in a system directory 114 and/or across multiple system directories 114 is performed by selecting the ways 208 with the minimum cache line populations across a set of active core complexes 102.

Alternatively or additionally capacity reduction 216 is applied to a system directory 114 by deactivating ways 208 with a maximum number of cache lines 204 in the Least Recently Used (LRU) position(s) of their corresponding system directory 114 sets 206 and/or by deactivating ways 208 holding a maximum number of cache lines 204 that will be selected as next eviction victims for their respective sets 206. An "eviction victim" and/or "victim," for instance, refers to a cache line that is selected for eviction (e.g., removal) from a cache, such as further to a cache replacement algorithm. LRU, for instance, is a cache replacement algorithm that is used to replace a cache when the space is full. When the cache memory is full, LRU picks the data that is least recently used and removes it to make space for the new data.

In such implementations the system directory 114 tracks the number of cache lines 204 in the LRU positions for each way 208 per set 206 via a 1D storage array 220 of N counters where N represents system directory 114 associativity. The 1D storage array 220 is updated at each system directory 114 replacement. A counter of entry X in the 1D storage array 220 is incremented when a cache line 204 residing in way X drops into the predefined position in a system directory 114 replacement stack. At the same update a counter of entry Y is decremented when the cache line 204 residing in way Y exits the predefined positions in the system directory 114 replacement stack. This implementation can deactivate ways 208 by maximizing the probability of evicting cache lines 204 with low probability of being touched before being evicted from their corresponding set 206. The described implementations, however, are implementable independent of and are not dependent on a particular replacement policy, e.g., are implementable using a policy other than LRU.

In at least some of the implementations described herein system directory 114 banks are power gated to reduce both dynamic and static power. An additional or alternative implementation is to clock gate the system directory 114 ways 208 and system directory 114 banks when applying capacity reduction 216 to a system directory 114. Clock gating, for instance, represents a power management technique for reducing dynamic power dissipation by removing and/or ignoring a clock signal when at least a portion of a circuit is not in use. This can enable dynamic power savings and avoid system directory 114 forced evictions and thus L3 cache forced invalidations from remaining active core complexes 102.

In at least some implementations the power modification 210 includes power gating private caches of the core complex 102 (e.g., L1 caches, L2 caches 106) but not power gating shared caches, e.g., an L3 cache 108 that is shared among different CPU cores 104. In such implementations the update message 212 indicates that private caches are power gated and that shared caches are not power gated. The directory controller 116 deactivates ways 208 associated with the private caches but not ways 208 associated with shared caches. Such implementations are applicable to more monolithic core complex structures.

Implementations also enable capacity activation 222 of the system directory 114. For instance, in implementations the power modification 210 indicates activation of the core complex 102 and the update message 212 notifies the system directory 114 of the activation. The directory controller 116 then applies capacity activation 222 to the system directory 114, such as to increase the capacity of the system directory 114 to track cache lines 204 of the caches 202.

Figure 3:
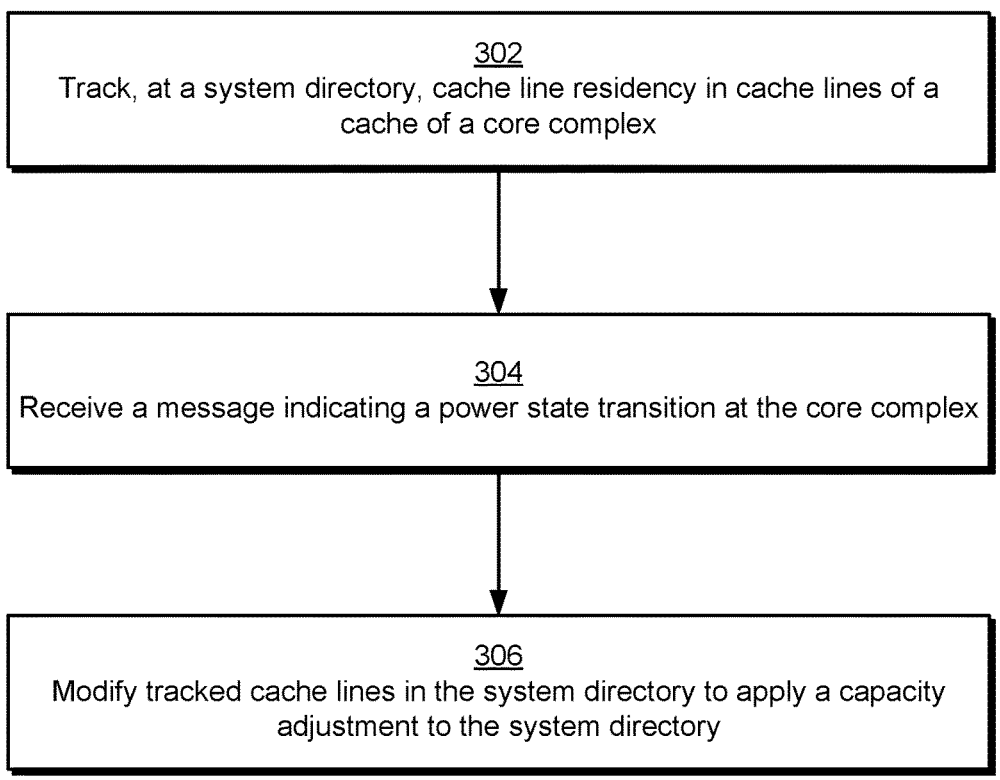
FIG. 3 depicts a method for modifying system directory capacity.

FIG. 3 depicts a method 300 for modifying system directory capacity. At block 302, cache line residency in cache lines of a cache of a core complex is tracked at a system directory. A directory controller 116, for instance, tracks the cache line residency. At block 304 a message is received indicating a power state transition at the core complex. The message is received, for example, by a directory controller 116 from a core complex 102. The power state transition, for instance, represents a decrease in power usage at the core complex or a decrease in power usage at the core complex. At block 306 tracked cache lines are modified in the system directory to apply a capacity adjustment to the system directory. Examples of modifying tracked cache lines include deactivating tracking of one or more of the tracked cache lines in one or more memory arrays of the system directory and/or activating tracking of one or more of the tracked cache lines in the one or more memory arrays of the system directory. In a power gating and/or clock gating scenario, for instance, the directory controller 116 reduces tracked cache lines in the system directory.

Figure 4:
FIG. 4 depicts a method for example ways for modifying system directory capacity.

FIG. 4 depicts a method 400 for example ways for modifying system directory capacity. At block 402 one or more tracking locations with a least number of tracked cache lines are identified among the tracking locations. In implementations, tracking locations represent data storage locations within a system directory that each track one or more cache line regions of a cache. A directory controller 116, for instance, identifies tracking locations with a least number of tracked cache lines. The ways 208, for example, represent examples of tracking locations within a system directory for tracking cache lines. At block 404 the one or more tracking locations are deactivated. For instance, the directory controller 116 deactivates the one or more tracking locations. According to implementations, deactivating tracking locations includes applying one or more of power gating or clock gating to the tracking locations, which reduces a capacity of the system directory and thus serves to reduce power usage of the system directory and conserves system power resources.

Figure 5:
FIG. 5 depicts a method for example ways for modifying system directory capacity.

FIG. 5 depicts a method 500 for example ways for modifying system directory capacity. At block 502 one or more tracking locations with a least populated cache line region are identified among the tracking locations. A directory controller 116, for instance, identifies the one or more tracking locations. At block 504 the one or more tracking locations are deactivated. For instance, the directory controller 116 deactivates the one or more tracking locations.

Figure 6:
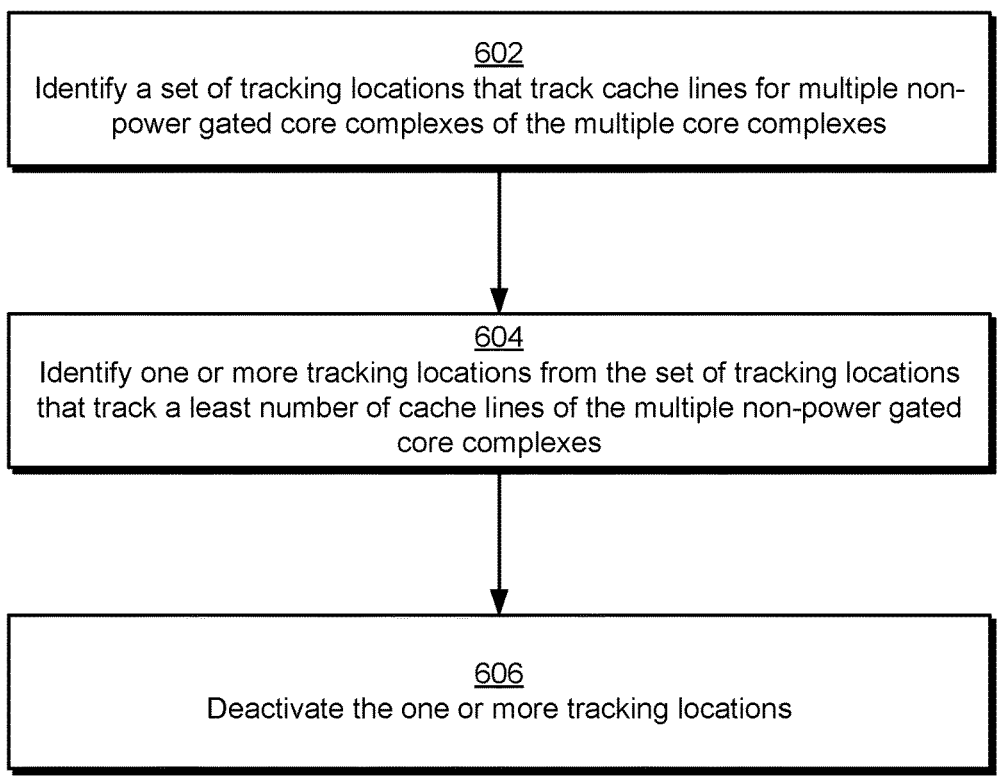
FIG. 6 depicts a method for example ways for modifying system directory capacity.

FIG. 6 depicts a method 600 for example ways for modifying system directory capacity. At block 602 a set of tracking locations that track cache lines for multiple non-power gated core complexes of the multiple core complexes is identified. The directory controller 116, for instance, identifies the set of tracking locations. At block 604 one or more tracking locations from the set of tracking locations that track a least number of cache lines of the multiple non-power gated core complexes are identified. For example, the directory controller 116 identifies the one or more tracking locations from the set of tracking locations. At block 606 the one or more tracking locations are deactivated. For instance, the directory controller 116 deactivates the one or more tracking locations.

Figure 7:
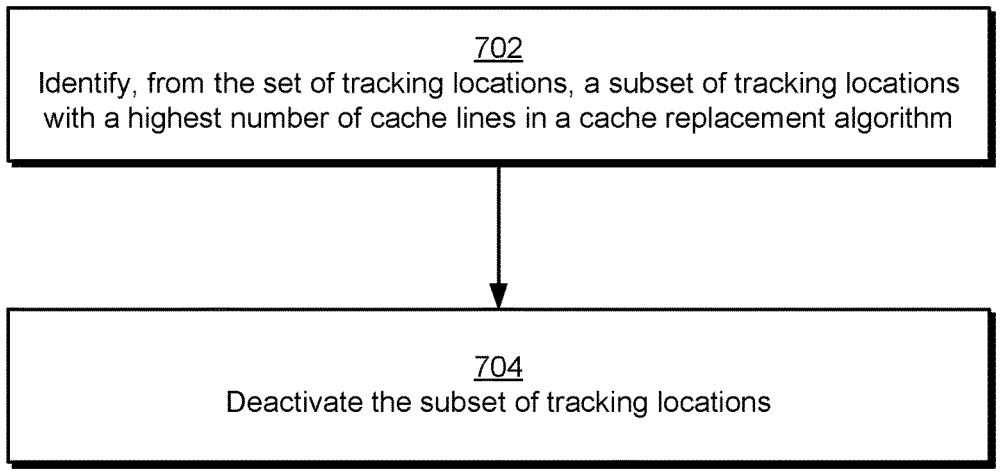
FIG. 7 depicts a method for example ways for modifying system directory capacity.

FIG. 7 depicts a method 700 for example ways for modifying system directory capacity. At block 702 a subset of tracking locations with a highest number of cache lines in a cache replacement algorithm are identified from the set of tracking locations. The directory controller 116, for example, identifies the subset of tracking locations. At block 704 the subset of tracking locations is deactivated. For instance, the directory controller 116 deactivates the subset of tracking locations.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the core complexes 102, the system directories 114, the directory controllers 116, etc.), are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A system comprising:
   a core complex including one or more processor cores and at least one cache; and
   a system directory implemented at least partially in hardware to receive a message indicating a power state transition of the core complex and to apply a capacity adjustment to the system directory based at least in part on an adjustment of cache capacity of the at least one cache as part of the power state transition of the core complex.

2. The system of claim 1, wherein the system directory comprises one or more memory arrays to track cache line residency in cache lines of the at least one cache, and to apply the capacity adjustment to the system directory is operable to modify tracked cache lines of the at least one cache in the one or more memory arrays.

3. The system of claim 2, wherein to modify the tracked cache lines, the system directory is operable to one or more of:
   deactivate tracking of one or more of the tracked cache lines in the one or more memory arrays; or
   activate tracking of one or more of the tracked cache lines in the one or more memory arrays.

4. The system of claim 3, wherein the message identifies multiple power gated cache lines of the at least one cache, and wherein to modify the tracked cache lines the system directory is operable to deactivate tracking of the multiple power gated cache lines in the one or more memory arrays.

5. The system of claim 1, wherein the system directory comprises tracking locations that each track one or more cache lines of the at least one cache, and wherein to apply the capacity adjustment to the system directory, the system directory is operable to:
   identify, among the tracking locations, one or more tracking locations with a least number of tracked cache lines; and
   deactivate the one or more tracking locations.

6. The system of claim 1, wherein the system directory comprises tracking locations that each track one or more cache line regions of the at least one cache, and wherein to apply the capacity adjustment to the system directory, the system directory is operable to:
   identify, among the tracking locations, one or more tracking locations with a least populated cache line region; and
   deactivate the one or more tracking locations.

7. The system of claim 1, wherein the system directory comprises tracking locations that each track one or more cache lines of caches of multiple core complexes, and wherein to apply the capacity adjustment to the system directory, the system directory is operable to:
   identify a set of tracking locations that track cache lines for multiple non-power gated core complexes of the multiple core complexes;
   identify one or more tracking locations from the set of tracking locations that track a least number of cache lines of the multiple non-power gated core complexes; and
   deactivate the one or more tracking locations.

8. The system of claim 1, wherein the system directory comprises a set of tracking locations that each track one or more cache lines of the at least one cache, and wherein to apply the capacity adjustment to the system directory, the system directory is operable to:
   identify, from the set of tracking locations, a subset of tracking locations with a highest number of cache lines being designated as a next victim in a cache replacement algorithm; and
   deactivate the subset of tracking locations.

9. The system of claim 1, wherein the system directory comprises a set of tracking locations that each track one or more cache lines of the at least one cache, and wherein to apply the capacity adjustment to the system directory, the system directory is operable to apply, to a subset of the tracking locations, one or more of power gating or clock gating.

10. A system directory implemented at least partially in hardware, the system directory comprising:
    one or more memory arrays to track cache line residency in cache lines of at least one cache of a core complex; and
    a directory controller to receive a message indicating a power adjustment at the core complex and to modify tracked cache lines in the one or more memory arrays to apply a capacity adjustment to the system directory.

11. The system directory of claim 10, wherein to modify the tracked cache lines, the directory controller is operable to one or more of:
    deactivate tracking of one or more of the tracked cache lines in the one or more memory arrays; or
    activate tracking of one or more of the tracked cache lines in the one or more memory arrays.

12. The system directory of claim 10, wherein the message identifies multiple power gated cache lines of the at least one cache, and wherein to modify the tracked cache lines the directory controller is operable to deactivate tracking of the multiple power gated cache lines in the one or more memory arrays.

13. The system directory of claim 10, wherein the system directory comprises tracking locations within the one or more memory arrays that each track one or more cache lines of the at least one cache, and wherein to apply the capacity adjustment to the system directory, the directory controller is operable to:
    identify, among the tracking locations, one or more tracking locations with a least number of tracked cache lines; and
    deactivate the one or more tracking locations.

14. The system directory of claim 10, wherein the system directory comprises tracking locations within the one or more memory arrays that each track one or more cache line regions of the at least one cache, and wherein to apply the capacity adjustment to the system directory, the directory controller is operable to:
    identify, among the tracking locations, one or more tracking locations with a least populated cache line region; and
    deactivate the one or more tracking locations.

15. The system directory of claim 10, wherein the system directory comprises tracking locations within the one or more memory arrays that each track one or more cache lines of caches of multiple core complexes, and wherein to apply the capacity adjustment to the system directory, the directory controller is operable to:
    identify a set of tracking locations that track cache lines for multiple non-power gated core complexes of the multiple core complexes;
    identify one or more tracking locations from the set of tracking locations that track a least number of cache lines of the multiple non-power gated core complexes; and
    deactivate the one or more tracking locations.

16. The system directory of claim 10, wherein the system directory comprises a set of tracking locations within the one or more memory arrays that each track one or more cache lines of the at least one cache, and wherein to apply the capacity adjustment to the system directory, the directory controller is operable to:

identify, from the set of tracking locations, a subset of tracking locations with a highest number of cache lines being designated as a next victim in a cache replacement algorithm; and deactivate the subset of tracking locations.

17. The system directory of claim 10, wherein the system directory comprises a set of tracking locations within the one or more memory arrays that each track one or more cache lines of the at least one cache, and wherein to apply the capacity adjustment to the system directory, the directory controller is operable to apply, to a subset of the tracking locations, one or more of power gating or clock gating.

18. A method comprising:
tracking, at a system directory, cache line residency in cache lines of a cache of a core complex;
receiving a message indicating a power state transition at the core complex; and
modifying, in the system directory, tracked cache lines to apply a capacity adjustment to the system directory.

19. The method of claim 18, wherein modifying the tracked cache lines to apply the capacity adjustment comprises one or more of:
deactivating one or more tracking locations within the system directory that correspond to power gated cache lines of the core complex; or
activating one or more tracking locations within the system directory that correspond to power gated cache lines of the core complex.

20. The method of claim 19, wherein deactivating the one or more tracking locations comprises applying one or more of power gating or clock gating to the one or more tracking locations.

* * * * *